United States Patent
Lee et al.

(10) Patent No.: US 12,369,197 B2
(45) Date of Patent: Jul. 22, 2025

(54) METHOD FOR TRANSMITTING OR RECEIVING SIGNAL FOR WIRELESS COMMUNICATION, AND DEVICE THEREFOR

(71) Applicant: LG ELECTRONICS INC., Seoul (KR)

(72) Inventors: Sunghoon Lee, Seoul (KR); Seonwook Kim, Seoul (KR); Jaehyung Kim, Seoul (KR); Seokmin Shin, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 17/996,034

(22) PCT Filed: May 14, 2021

(86) PCT No.: PCT/KR2021/006058
§ 371 (c)(1),
(2) Date: Oct. 12, 2022

(87) PCT Pub. No.: WO2021/230701
PCT Pub. Date: Nov. 18, 2021

(65) Prior Publication Data
US 2023/0217498 A1    Jul. 6, 2023

(30) Foreign Application Priority Data
May 14, 2020    (KR) .................. 10-2020-0057995

(51) Int. Cl.
*H04W 74/0833*    (2024.01)
*H04W 74/00*    (2009.01)

(52) U.S. Cl.
CPC ..... *H04W 74/0833* (2013.01); *H04W 74/002* (2013.01)

(58) Field of Classification Search
None
See application file for complete search history.

(56) References Cited

U.S. PATENT DOCUMENTS

2012/0275390 A1* 11/2012 Korhonen ........... H04W 74/006
   370/329
2012/0300714 A1* 11/2012 Ng .................... H04W 74/0833
   370/329

(Continued)

FOREIGN PATENT DOCUMENTS

KR    1020140031228    3/2014
WO    2019-099709    5/2019

(Continued)

OTHER PUBLICATIONS

PCT International Application No. PCT/KR2021/006058, International Search Report dated Aug. 18, 2021, 3 pages.

(Continued)

*Primary Examiner* — Faiyazkhan Ghafoerkhan
(74) *Attorney, Agent, or Firm* — LEE, HONG, DEGERMAN, KANG & WAIMEY

(57) ABSTRACT

A base station according to an embodiment of the present invention may determine multiple different RA-RNTIs, and transmit message 2 for a random access response on the basis that: the base station supports not only a random access procedure of a first type terminal having a first maximum terminal bandwidth, but also a random access procedure of a second type terminal having a second maximum terminal bandwidth smaller than the first maximum terminal bandwidth; message 1 including a PRACH preamble has been detected on a PRACH resource shared between the first type terminal and the second type terminal; and at least one of PRACH preamble sequences for the first type terminal is reused for the second type terminal.

15 Claims, 10 Drawing Sheets

| Bit-Mask (for CRC scrambling of Msg2-PDCCH) | UE type | B0 : B7 | B8 : B23 |
|---|---|---|---|
| | RedCap | Non-zero | RA-RNTI value for RedCap UE |
| | Non-Redcap | All 0s | RA-RNTI value for Non-RedCap UE |

(56) References Cited

U.S. PATENT DOCUMENTS

| | | | | |
|---|---|---|---|---|
| 2018/0042015 A1* | 2/2018 | Yin | .................. | H04W 72/23 |
| 2018/0167170 A1* | 6/2018 | Kim | .................. | H04L 1/189 |
| 2019/0037586 A1* | 1/2019 | Park | .................... | H04L 5/00 |
| 2019/0327736 A1* | 10/2019 | Takeda | .............. | H04W 72/0446 |
| 2020/0221504 A1* | 7/2020 | Cirik | .................... | H04L 1/1864 |
| 2020/0245272 A1* | 7/2020 | Hong | .................. | H04W 56/001 |
| 2020/0267773 A1* | 8/2020 | Islam | .................... | H04W 72/23 |
| 2020/0304239 A1* | 9/2020 | Yang | .................. | H04L 1/18 |
| 2020/0314815 A1* | 10/2020 | Kim | .................... | H04L 1/1854 |
| 2021/0076384 A1* | 3/2021 | MolavianJazi | ... | H04W 74/0833 |
| 2022/0377799 A1* | 11/2022 | MolavianJazi | ....... | H04W 52/42 |

FOREIGN PATENT DOCUMENTS

| | | |
|---|---|---|
| WO | 2019-191978 | 10/2019 |
| WO | 2020-009511 | 1/2020 |

OTHER PUBLICATIONS

Korean Intellectual Property Office Application No. 10-2022-7032614, Notice of Allowance dated Apr. 3, 2025, 8 pages.

* cited by examiner (a)

(a)

METHOD FOR TRANSMITTING OR RECEIVING SIGNAL FOR WIRELESS COMMUNICATION, AND DEVICE THEREFOR

CROSS-REFERENCE TO RELATED APPLICATION(S)

This application is the National Stage filing under 35 U.S.C. 371 of International Application No. PCT/KR2021/006058, filed on May 14, 2021, which claims the benefit of earlier filing date and right of priority to Korean Application No. 10-2020-0057995, filed on May 14, 2020, the contents of which are all hereby incorporated by reference herein in their entireties.

TECHNICAL FIELD

The present disclosure relates to wireless communication, and more particularly, to a method and apparatus for a random access procedure in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method for an efficient random access procedure and apparatus for performing the same.

The present disclosure is not limited to the above-described object, and other objects that the present disclosure could achieve will be more clearly understood from the following detailed description.

Technical Solution

In an aspect of the present disclosure, there is provided a method of performing, by a base station (BS), a random access procedure with a user equipment (UE) in a 3rd generation partnership project (3GPP) based wireless communication system. The method may include: detecting a message 1 (Msg1) including a physical random access channel (PRACH) preamble; and transmitting a message 2 (Msg2) for a random access response based on the Msg1. In the transmission of the Msg2, based on (a) that the BS supports a random access procedure for a first type of UE having a first maximum UE bandwidth in addition to a random access procedure for a second type of UE having a second maximum UE bandwidth smaller than the first maximum UE bandwidth; (b) that the Msg1 is detected on a PRACH resource shared between the first type of UE and the second type of UE; and (c) that at least one of PRACH preamble sequences for the first type of UE is reused for the second type of UE, the BS may: determine a plurality of different random access radio network temporary identifiers (RA-RNTIs); and transmit the Msg2 based on at least one of the plurality of RA-RNTIs.

In another aspect of the present disclosure, there is provided a BS configured to operate in a 3GPP based wireless communication system. The BS may include: a transceiver; and a processor configured to control the transceiver to detect a Msg1 including a PRACH preamble and transmit a Msg2 for a random access response based on the Msg1. In the transmission of the Msg2, based on (a) that the BS supports a random access procedure for a first type of UE having a first maximum UE bandwidth in addition to a random access procedure for a second type of UE having a second maximum UE bandwidth smaller than the first maximum UE bandwidth; (b) that the Msg1 is detected on a PRACH resource shared between the first type of UE and the second type of UE; and (c) that at least one of PRACH preamble sequences for the first type of UE is reused for the second type of UE, the processor may: determine a plurality of different RA-RNTIs; and transmit the Msg2 based on at least one of the plurality of RA-RNTIs.

In another aspect of the present disclosure, there is provided a method of performing, by a UE, a random access procedure to a BS in a 3GPP based wireless communication system. The method may include: transmitting a Msg1 including a PRACH preamble; and detecting a Msg2 for a random access response based on the Msg1. The UE may be a second type of UE having a second maximum UE bandwidth smaller than a first maximum UE bandwidth supported by a first type of UE. Even though the Msg1 is transmitted based on a same PRACH preamble sequence and a same PRACH resource as a PRACH preamble sequence and a PRACH resource used by the first type of UE, the UE may detect the Msg2 based on a second type of RA-RNTI different from a first type of RA-RNTI used by the first type of UE.

In another aspect of the present disclosure, there is provided a processor-readable medium storing instructions for performing the above-described method.

In another aspect of the present disclosure, there is provided a UE in a 3GPP based wireless communication system. The UE may include: a transceiver; and a processor configured to control the transceiver to transmit a Msg1 including a PRACH preamble and detect a Msg2 for a random access response based on the Msg1. The UE may be a second type of UE having a second maximum UE bandwidth smaller than a first maximum UE bandwidth supported by a first type of UE. Even though the Msg1 is transmitted based on a same PRACH preamble sequence and a same PRACH resource as a PRACH preamble sequence and a PRACH resource used by the first type of UE, the processor may detect the Msg2 based on a second type of RA-RNTI different from a first type of RA-RNTI used by the first type of UE.

In a further aspect of the present disclosure, there is provided a device configured to perform signal processing for 3rd generation partnership project (3GPP) based wireless communication. The device may include: a memory configured to store instructions; and a processor configured to perform operations by executing the instructions stored in the memory. The operations performed by the processor based on the execution of the instructions may include:

transmitting a Msg1 including a PRACH preamble; and detecting a Msg2 for a random access response based on the Msg1. The device may be a second type of device having a second maximum bandwidth smaller than a first maximum bandwidth supported by a first type of device. Even though the Msg1 is transmitted based on a same PRACH preamble sequence and a same PRACH resource as a PRACH preamble sequence and a PRACH resource used by the first type of device, the processor may detect the Msg2 based on a second type of RA-RNTI different from a first type of RA-RNTI used by the first type of device.

The plurality of RA-RNTIs may include a first type of RA-RNTI related to the first type of UE and a second type of RA-RNTI related to the second type of UE. The second type of RA-RNTI may be determined by applying an offset to the first type of RA-RNTI.

In the transmission of the Msg2, the BS may transmit both a Msg2 for the first type of UE and a Msg2 for the second type of UE based on the plurality of RA-RNTIs.

The BS may receive a message 3 (Msg3) in response to the Msg2. The BS may determine whether a UE transmitting the PRACH preamble is either the first type of UE or the second type of UE, based on which RA-RNTI among the plurality of RA-RNTIs is associated with the Msg3.

The UE, for example, the second type of UE may be a reduced capability user equipment (RedCap UE) in the 3GPP based wireless communication system. The RedCap UE may be an intelligent surveillance camera, a smart watch, or a smart meter.

Advantageous Effects

According to an embodiment of the present disclosure, a random access procedure may be efficiently performed in a wireless communication system where different types of UEs coexist.

The present disclosure is not limited to the above-described effect, and other effects that the present disclosure could achieve will be more clearly understood from the following detailed description.

DETAILED DESCRIPTION

Figure 1:
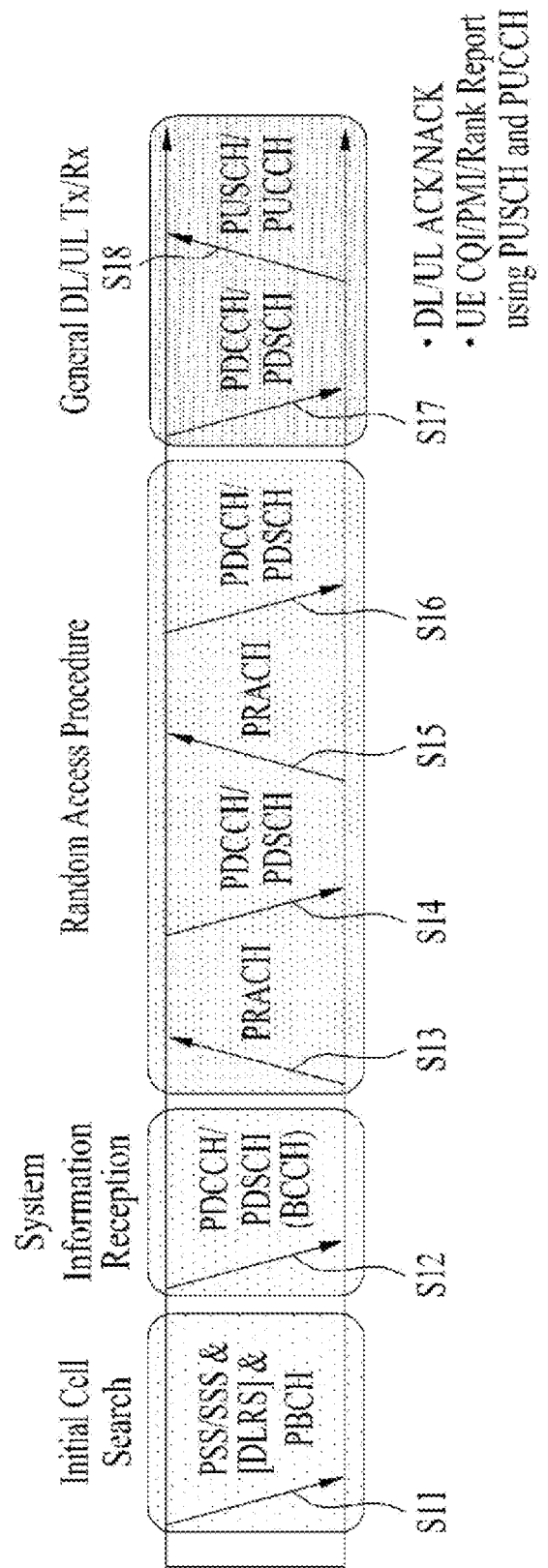
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, proposals and so on are distinguished from each other and indexed, for convenience of description, which does not mean that each of them necessarily constitutes an independent disclosure or that each of them should be implemented only individually. Unless explicitly contradicting each other, it may be derived/understood that at least some of the sections, embodiments, examples, options, methods, schemes, proposals and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
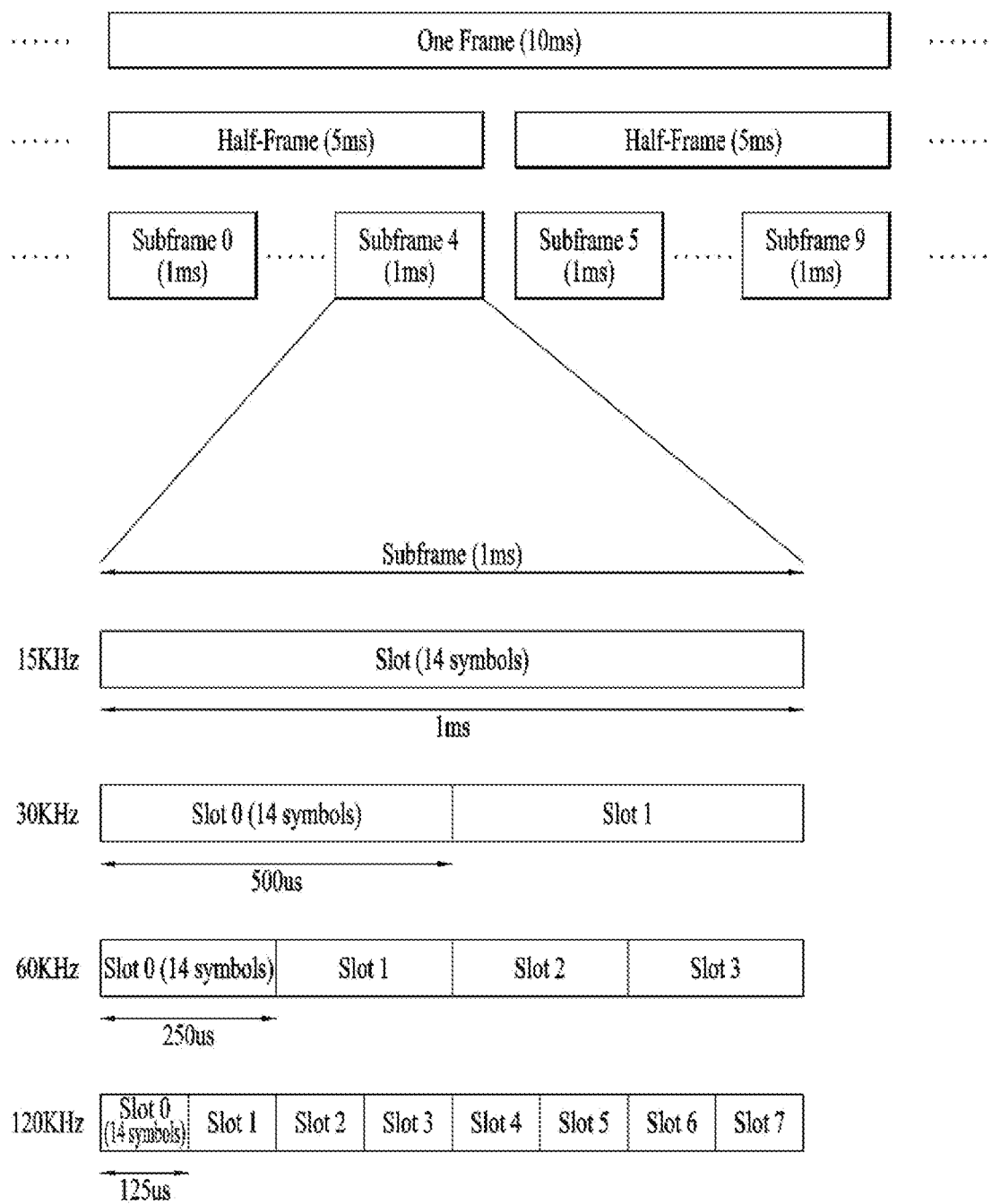
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
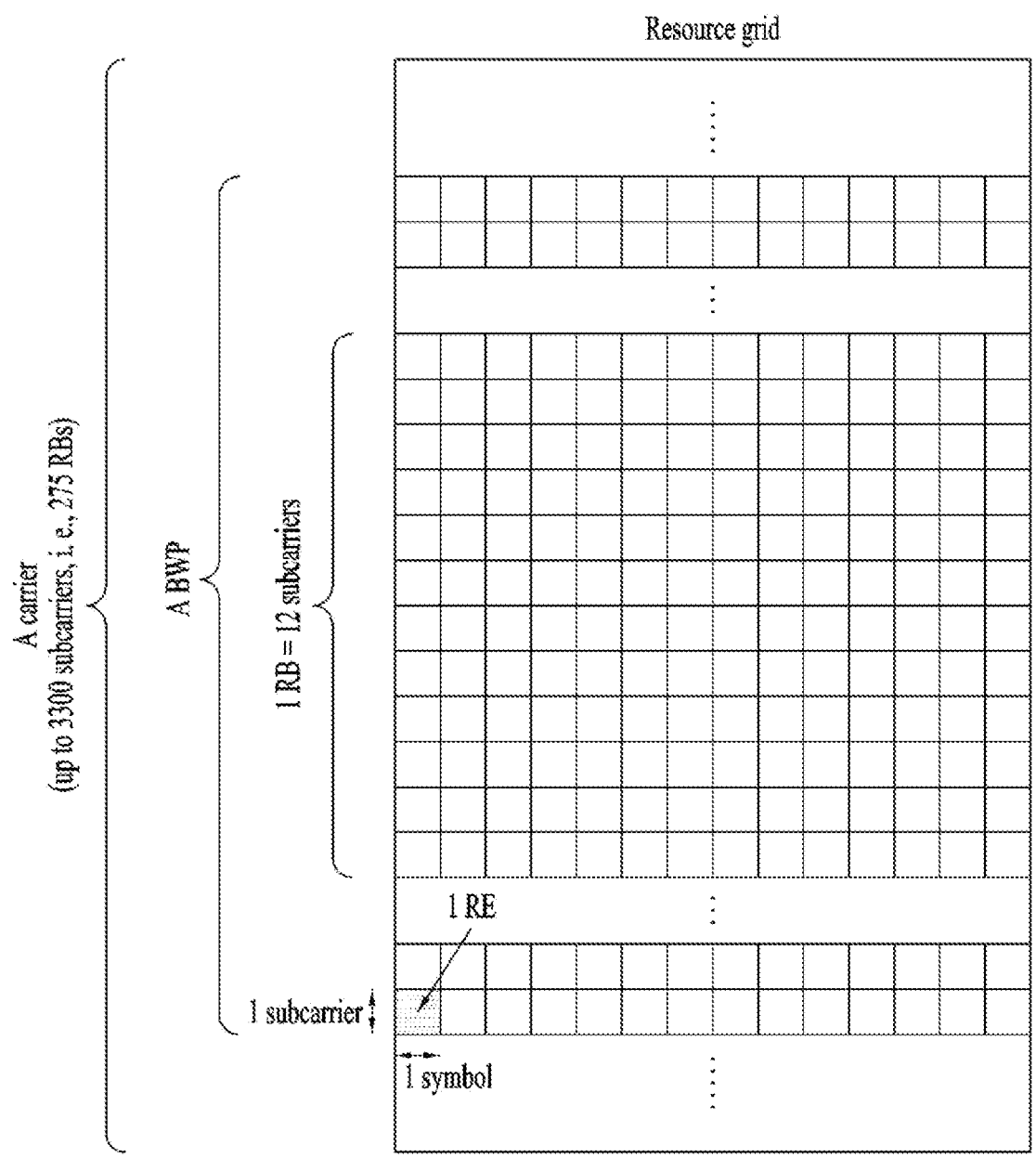
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.).

The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
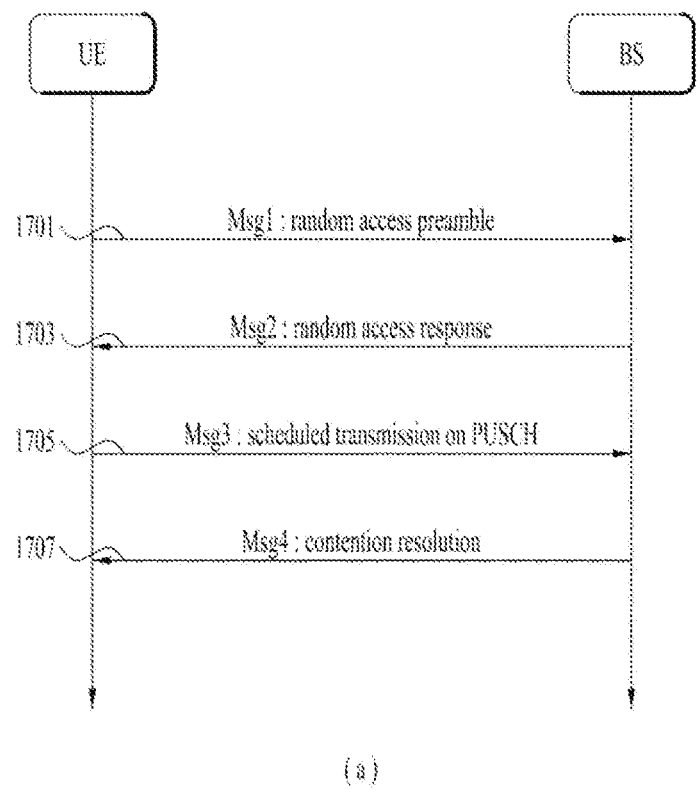
FIG. 4 illustrates a random access procedure.
Figure 4:
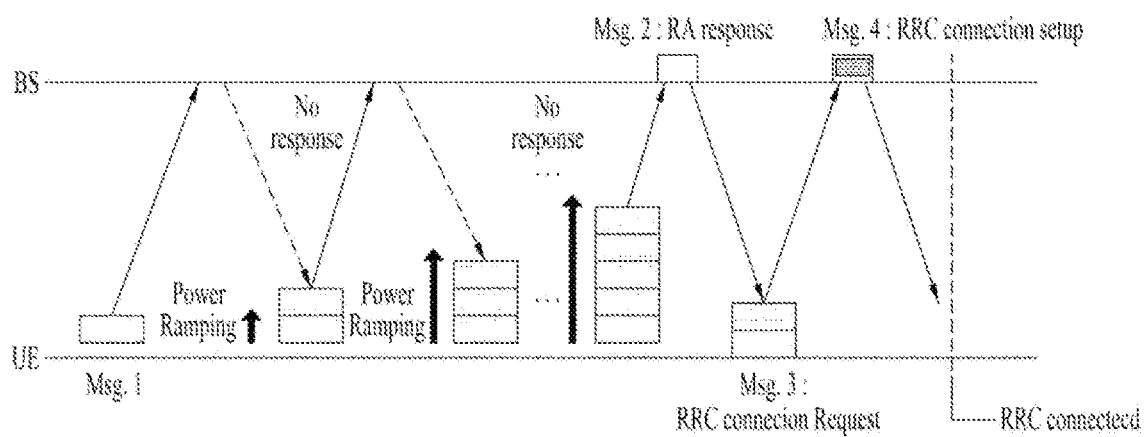

FIG. 4 illustrates an exemplary normal random access procedure. Specifically, FIG. 4 shows a contention-based random access procedure of the UE, which is performed in four steps.

First, the UE may transmit message 1 (Msg1) including a random access preamble on a PRACH (see 1701 of FIG. 4(a)).

Random access preamble sequences with different lengths may be supported. A long sequence length of 839 may be applied to SCSs of 1.25 and 5 kHz, and a short sequence length of 139 may be applied to SCSs of 15, 30, 60, and 120 kHz.

Multiple preamble formats may be defined by one or more RACH OFDM symbols and different CPs (and/or guard times). A RACH configuration for a cell may be included in SI about the cell and provided to the UE. The RACH configuration may include information on the SCS of the PRACH, available preambles, preamble formats, and so on. The RACH configuration may include information about association between SSBs and RACH (time-frequency) resources. The UE transmits a random access preamble on a RACH time-frequency resource associated with a detected or selected SSB.

The threshold of an SSB for RACH resource association may be configured by the network, and a RACH preamble may be transmitted or retransmitted based on an SSB where reference signal received power (RSRP), which is measured based on the SSB, satisfies the threshold. For example, the UE may select one SSB from among SSBs that satisfy the threshold and transmit or retransmit the RACH preamble based on a RACH resource associated with the selected SSB.

Upon receiving the random access preamble from the UE, the BS may transmit message 2 (Msg2) corresponding to a random access response (RAR) message to the UE (see 1703 of FIG. 4(a)). A PDCCH scheduling a PDSCH carrying the RAR may be CRC masked with a random access (RA) radio network temporary identifier (RNTI) (RA-RNTI) and then transmitted. Upon detecting the PDCCH masked by the RA-RNTI, the UE may obtain the RAR from the PDSCH scheduled by DCI carried by the PDCCH. The UE may check whether the RAR includes RAR information in response to the preamble transmitted by the UE, i.e., Msg1. The presence or absence of the RAR information in response to Msg1 transmitted by the UE may be determined depending on whether there is a random access preamble ID for the preamble transmitted by the UE. If there is no response to Msg1, the UE may retransmit the RACH preamble within a predetermined number of times while performing power ramping. The UE may calculate PRACH transmit power for retransmitting the preamble based on the most recent path loss and power ramping counter.

The RAR information transmitted on the PDSCH may include timing advance (TA) information for UL synchronization, an initial UL grant, and a temporary cell-RNTI (C-RNTI). The TA information may be used to control a UL signal transmission timing. The UE may transmit a UL signal over a UL shared channel as message 3 (Msg3) of the random access procedure based on the RAR information (see 1705 of FIG. 4(a)). Msg3 may include an RRC connection request and a UE identifier. In response to Msg3, the network may transmit message 4 (Msg4), which may be treated as a contention resolution message on DL (see 1707 of FIG. 4(a)). Upon receiving Msg4, the UE may enter the RRC_CONNECTED state.

On the other hand, a contention-free random access procedure may be performed when the UE is handed over to another cell or BS or when it is requested by the BS. In the contention-free random access procedure, a preamble to be used by the UE (hereinafter referred to as a dedicated random access preamble) is allocated by the BS. Information on the dedicated random access preamble may be included in an RRC message (e.g., handover command) or provided to the UE through a PDCCH order. When the random access procedure is initiated, the UE may transmit the dedicated random access preamble to the BS. When the UE receives an RAR from the BS, the random access procedure is completed.

As described above, a UL grant in the RAR may schedule PUSCH transmission to the UE. A PUSCH carrying initial UL transmission based on the UL grant in the RAR is referred to as an Msg3 PUSCH. The content of an RAR UL grant may start at the MSB and end at the LSB, and the content may be given as shown in Table 3.

TABLE 3

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

Figure 5:
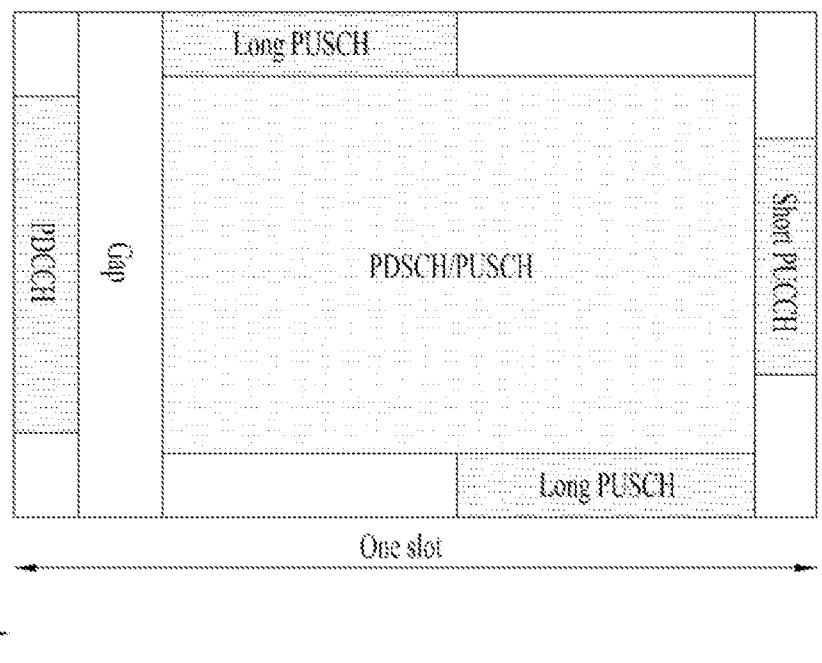
FIG. 5 illustrates an example of physical channel mapping.
Figure 6:
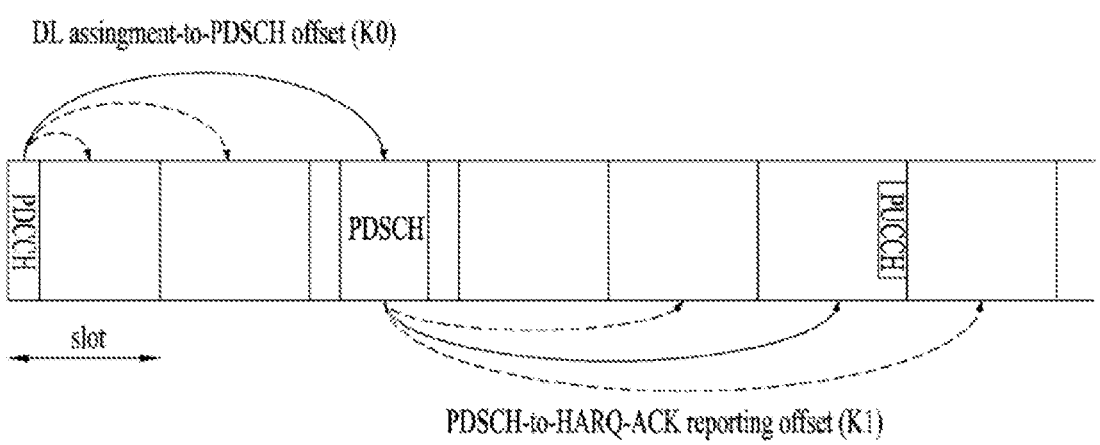
FIG. 6 illustrates an exemplary acknowledgment/negative acknowledgment (ACK/NACK) transmission process.
Figure 7:
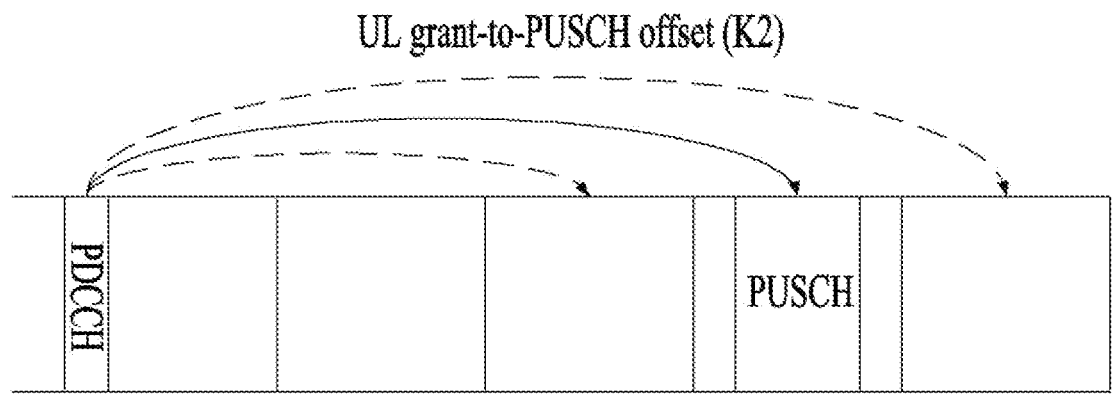
FIG. 7 illustrates an exemplary physical uplink shared channel (PUSCH) transmission process.
Figure 8:
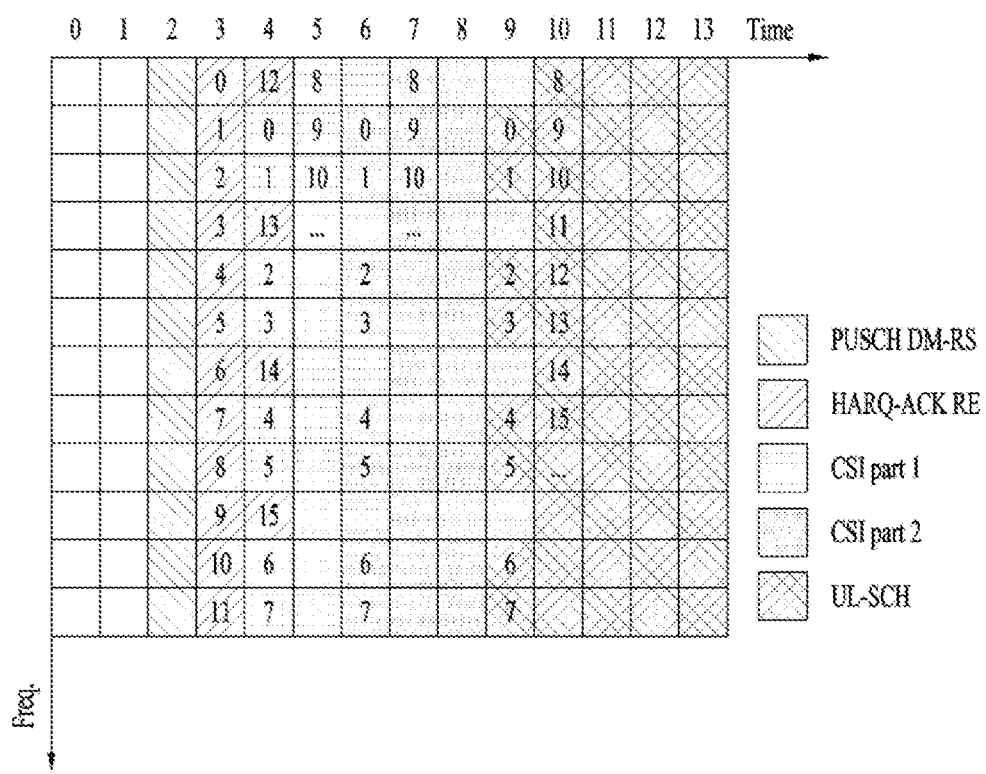
FIG. 8 illustrates an example of multiplexing control information in a PUSCH.

FIG. 5 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P) RB. The PDCCH is transmitted in a control resource set (CORE-SET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured through higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.
monitoringSlotPeriodicityAndOffset: A PDCCH monitoring periodicity (in slots) and a PDCCH monitoring offset (in slots).
monitoringSymbols WithinSlot: PDCCH monitoring symbols in a slot (e.g., the first symbol(s) of a CORESET).
nrofCandidates: The number of PDCCH candidates (one of 0, 1, 2, 3, 4, 5, 6, and 8) for each AL={1, 2, 4, 8, 16}.

An occasion (e.g., time/frequency resources) in which the UE is to monitor PDCCH candidates is defined as a PDCCH (monitoring) occasion. One or more PDCCH (monitoring) occasions may be configured in a slot.

Table 4 shows the characteristics of each SS.

TABLE 4

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |

TABLE 4-continued

| Type | Search Space | RNTI | Use Case |
| --- | --- | --- | --- |
| | UE Specific | C-RNTI, or MCS-C-RNTI, or CS-RNTI(s) | User specific PDSCH decoding |

Table 5 shows DCI formats transmitted on the PDCCH.

TABLE 5

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR (Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Reduced Capability (RedCap) Device

In the 3GPP Rel-17 NR system, research/standardization of RedCap devices is planned. The requirements of a RedCap UE may be higher than those of a legacy low power wide area (LPWA) UE (e.g., 3GPP LTE-M/NB IoT UE), whereas the requirements of the RedCap UE may be lower than those of a URLLC/eMBB UE in NR. The characteristics of the RedCap UE may include at least one of a reduced number of UE Rx/Tx antennas, a UE bandwidth reduction, half-duplex FDD, and/or a relaxed UE processing time/capability. The RedCap UE may not support the processing time/capability of a conventional NR random access procedure due to the relaxed UE processing time/capability. Considering that a UE Capability Report message is exchanged based on an RRC connection, the following problem may occur: during a random access procedure having no RRC connection established, the network is incapable of recognizing whether a UE performing the random access is the RedCap UE and/or the capability of the RedCap UE.

According to one aspect of present disclosure, there is provided a method of enabling a network to distinguish a RedCap UE from a normal NR UE (or Non-RedCap UE) during a random access procedure, for example, a method for identifying/indicating that the corresponding UE is the RedCap UE. According to another aspect of the present disclosure, there is provided a method of allowing a RedCap UE to support a relaxed processing time/capability different from that of NR.

For convenience of description, the RedCap UE and Non-RedCap UE may be regarded as different types of UEs. The Non-RedCap UE may be referred to as a first type of UE, and the RedCap UE may be referred to as a second type of UE. The UE maximum bandwidth of the RedCap UE may be smaller than the UE maximum bandwidth of the Non-RedCap UE. The Non-RedCap UE may also be referred to as a legacy UE or a normal UE, for convenience. The legacy UE may be interpreted as a UE that is not a RedCap type of UE, but the legacy UE does not need to be limited to Rel. 15/16.

The normal UE (legacy UE) operating in Rel-15 and Rel-16 NR systems may first acquire an MIB from a broadcast SSB before performing random access to the network. In the NR system, an SSB is set to 20 RBs for all SCSs.

For example, the RedCap UE may equally use the SSB in the legacy NR system. The MIB may include control information (e.g., PDCCH in CORESET 0) for scheduling system information block 1 (SIB1), and SIB1 may include basic information for random access. The information may also include information on an initial BWP where random access is performed. The RedCap UE may operate with different bandwidths in frequency range 1 (FR1) and frequency range 2 (FR2). For example, the RedCap UE may be configured/defined to support a first maximum bandwidth (BW) (e.g., 20 MHz) in FR1 and support a second maximum BW (e.g., 100 MHz) (>first maximum BW) in FR2. According to another configuration, the RedCap UE may operate with a transmission BW of 5/10 MHz in FR1 and operate with a transmission BW of 40/80 MHz in FR2. As described above, due to the limitation of the maximum BW that the RedCap UE is capable of processing, the RedCap UE may not properly support the initial BWP of the Rel-15 and Rel-16 NR systems.

As described with reference to FIG. 4, the random access procedure may include four steps. The messages in the individual steps may be referred to as a PRACH preamble (Msg1), an RAR (Msg2), Msg3 (e.g., 1705 of FIG. 4), and Msg4 (e.g., 1707 of FIG. 4), respectively. Msg1 and Msg3 are UL transmissions performed in an initial UL BWP, and Msg2 and Msg4 are DL transmissions performed in an initial DL BWP. A processing times related to the above message transmission and reception is given by a default table, which is created on the assumption that the NR UE has a certain capability. Since the capability of the RedCap UE may be lower than that of the legacy UE, the RedCap UE may not perform the message transmission and reception within the processing time according to the default table.

The present disclosure provides proposals for solving the above-described problem.

For example, a method of allowing the RedCap UE to perform random access by sharing resources with the legacy UE is provided. That is, the RedCap UE may share resources for random access with the legacy UE to improve the efficiency of using the random access resources. If random access (RA) resources dedicated to the RedCap UE are allocated separately from RA resources for the legacy UE, there may be a problem that the RS resources for the legacy UE become insufficient. In addition, the resources dedicated to the RedCap UE may cause wastage of resources due to their low frequency of use.

For example, there is provided a method in which the network schedules Msg3 transmission (see 1705 of FIG. 4(*a*)) of the RedCap UE differently from that of the legacy UE through the Msg1 and Msg2 transmission and reception processes (see 1701 and 1703 of FIG. 4(*a*)). By doing so, the RedCap UE may be allowed to transmit each message with a relaxed processing time while performing the RA. For example, the processing time required for the RedCap UE in the RA procedure may be configured/defined to be longer than the processing time required for the legacy UE.

Hereinafter, it is assumed that the RedCap UE is configured with an initial UL/DL BWP based on SIB1 shared with or separated from that of the legacy UE. The initial UL BWP of the RedCap UE may be set smaller than the initial BWP of the legacy UE. The initial UL BWP of the RedCap UE may completely or partially overlap with the initial BWP of the legacy UE. The RedCap UE and legacy UE may share a resource (e.g., random access occasion (RO)) for transmitting a PRACH preamble in the initial UL BWP. For example, ROs of the RedCap UE are completely included in ROs of the legacy UE, but the number of ROs of the RedCap UE may be set differently (to be small) due to the smaller initial UL BWP of the RedCap UE. In the frequency domain, the initial DL BWP of the RedCap UE may be configured such that the initial DL BWP of the RedCap UE is smaller than the initial BWP of the legacy UE and completely or partially overlaps with the initial BWP of the legacy UE.

In the following proposals, it is assumed that the initial BWP of the RedCap UE is set smaller than the initial BWP of the legacy UE, and the initial BWP of the RedCap UE completely/partially overlaps with the initial BWP of the legacy UE, but the present disclosure is not limited thereto. For example, the present disclosure may be applied even when the initial BWP of the RedCap UE is set equal to the initial BWP of the legacy UE. In addition, the present disclosure may be applied even when the initial BWP of the RedCap UE does not overlap with the initial BWP of the legacy UE.

[Proposal 1] Identification Between RedCap UE and Legacy UE Based on RA-RNTI and Msg2 Transmission For example, the RedCap UE may share at least parts of RA configurations such as an RO, a preamble ID, and a search space with the legacy UE. When the RedCap UE sharing the at least parts of the RA configurations with the legacy UE transmits a PRACH preamble (Msg1), the network may configure different Msg3 scheduling for the RedCap UE from that for the legacy UEs based on the RA-RNTI and Msg2 transmission.

The NR UE may start the RA procedure to the network by transmitting a long or short preamble on an RO. In the Rel-15 and Rel-16 NR systems, 8 frequency division multiplexed (FDMed) ROs may be configured at the same time.

Considering the minimum bandwidth supported by the RedCap UE, it may be assumed that the RedCap UE is capable of supporting both short and long preambles of the Rel-15 and Rel-16 NR systems.

Assuming that the initial UL BWP of the RedCap UE overlaps at least partially with the initial UL BWP of the legacy UE, and that the RedCap UE is capable of sharing at least one RO with the legacy UE. The number of ROs on which the RedCap UE is capable of transmitting the PRACH preamble may be set to 8 or less.

In the Rel-15 and Rel-16 NR system, an RA-RNTI is calculated as in Equation 1.

$$\text{RA-RNTI}=1+s\_id+14\times t\_id+14\times 80\times f\_id+14\times 80\times 8\times ul\_carrier\_id \quad \text{[Equation 1]}$$

s_id: first OFDM symbol index (0≤s_id<14)
t_id: first slot index in system frame (0≤t_id<80)
f_id: frequency domain index (0≤f_id<8)
ul_carrier_id: indication of UL carrier (0: normal, 1: SUL)

As shown in Equation 1 above, the RA-RNTI is determined based on the starting symbol of an RO, the starting slot of a system frame, and the location in the frequency domain. If ROs are the same, RA-RNTIs are calculated to have the same value.

In the proposed example, even if the RedCap UE shares the same RO with the legacy UE, the RA-RNTI calculated by the RedCap UE may be different from the RA-RNTI calculated by the legacy UE. Therefore, the RedCap UE and the legacy UE may be identified by the RA-RNTIs during the RA procedure. The RedCap UE may calculate the RA-RNTI based on an equation different from that of the legacy UE. Alternatively, even though the same equation is used, variables used in the corresponding equation may be interpreted/applied differently. Thus, different UEs transmitting Msg1 on the same RO may determine different RA-RNTIs.

Therefore, upon receiving Msg1 on the RO shared between the RedCap UE and the legacy UE, the network, the network may transmit by masking scheduling information for the RedCap UE (e.g., a PDCCH scheduling a Msg2 PDSCH) and scheduling information for the legacy UE with different RA-RNTIs. For example, the RA-RNTI used for CRC-scrambling of the PDCCH for scheduling the Msg2 PDSCH may be determined differently for the RedCap UE and the legacy UE.

Accordingly, resources may be allocated in consideration of the processing time/capacity of the RedCap UE. For example, the network may (i) transmit a first PDCCH by scrambling the CRC of the first PDCCH scheduling the Msg2 PDSCH based on the processing time/capacity of the legacy UE with a first type of RA-RNTI for the legacy UE, and (ii) transmit a second PDCCH by scrambling the CRC of the second PDCCH scheduling the Msg2 PDSCH based on the processing time/capacity of the RedCap UE with a second type of RA-RNTI for the RedCap UE.

[Proposal 1-1] RedCap UE May Calculate Different RA-RNTI from Legacy UE Based on Frequency Index of RO, f_id For example, the starting point (e.g., the frequency location/subcarrier corresponding to f_id=0) of the frequency index of the RO, f_id may be defined differently for the RedCap UE and the legacy UE. For example, the RedCap UE and the legacy UE may perform f_id indexing in reverse order (e.g., ascending/descending order).

According to f_id indexing in the Rel-15 and Rel-16 NR systems, 0 to 7 may be indexed in order from low frequency to high frequency. The initial UL BWP of the RedCap UE may be set smaller than the initial UL BWP of the legacy UE, and the initial UL BWP of the RedCap UE may overlap with the initial UL BWP of the legacy UE. In this case, the RedCap UE may be configured to share some of the ROs of the legacy UE. Assuming that the RedCap UE is configured to share N_RO ROs from RO #start of the legacy UE, RO #start to RO #(start+N_RO−1) of the legacy UE may be indexed from RO #0 to RO #(N_RO−1) for the RedCap UE.

Figure 9:
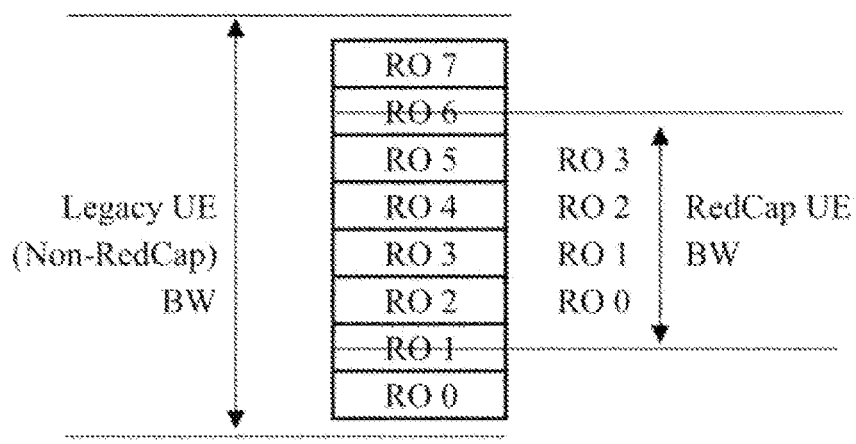
FIG. 9 illustrates exemplary indexing of random access occasions (ROs) according to an embodiment of the present disclosure.
Figure 9:
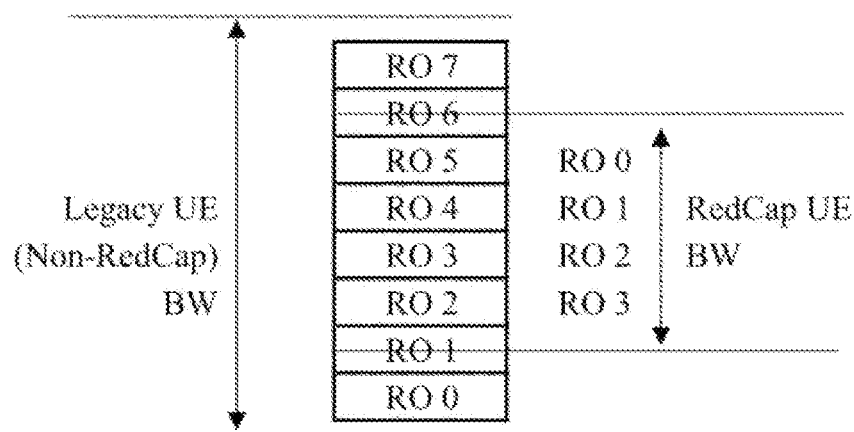

FIG. 9 illustrates exemplary frequency-domain indexing of ROs for a RedCap UE.

FIG. 9(a) shows an example in which #start is 2 and N_RO is 4. In this method, the network needs be able to configure the initial UL BWP of the RedCap UE such that #start does not become 0.

According another configuration, if the RedCap UE is configured to share N_RO ROS from RO #start of the legacy UE, RO #start to RO #(start+N_RO−1) of the legacy UE may be indexed from RO #(N_RO−1) to RO #0 for the RedCap UE. FIG. 9(a) shows exemplary indexing in reverse order when #start is 2 and N_RO is 4. In this case, the network needs to be able to configure the initial UL BWP of the RedCap UE such that the #start does not become #(N_RO−1).

According to Proposal 1-1, when the network is capable of configuring the initial UL BWP of the RedCap UE such that a specific condition is not satisfied, the network may perform scheduling by identifying the RedCap separately without introducing additional variables to the RedCap UE or without changing the RA-RNTI calculation.

[Proposal 1-2] Application of Offset to RA-RNTI Calculation for RedCap UE

For example, the RedCap UE may obtain a different RA-RNTI from that of the legacy UE by adding an offset to the RA-RNTI calculation equation.

The RA-RNTI range for the RedCap UE may be designated by additionally applying the offset to the RA-RNTI calculation equation of the Rel-15 and Rel-16 NR systems. For example, when the additional offset is applied, the RA-RNTI may be calculated as in Equation 2.

$$\text{RA-RNTI}=1+s\_id+14\times t\_id+14\times 80\times f\_id+14\times 80\times 8\times ul\_carrier\_id+\text{Offset} \quad \text{[Equation 2]}$$

For example, the offset may be 14×80×8×2×2=35840, but the present disclosure is not limited thereto.

The legacy RA-RNTI has an integer value between 1 and 17920. Since values between 17921 and 35840 are assigned (or reserved) for other technologies, a value between 35841 and 53760 may be allocated as the RA-RNTI for the RedCap UE.

According to Proposal 1-2, the network may freely configure the initial UL BWP of the RedCap UE without any constraints. That is, Proposal 1-2 is suitable for a case in which the RedCap UE is capable of supporting a relatively wide BW, similarly to the legacy UE.

[Proposal 1-3] RedCap UE May Apply Offset to Each ID Used for RA-RNTI Calculation to Calculate Different RA-RNTI from that of Legacy UE.

The initial BWP of the RedCap UE may be set smaller than the initial BWP of the legacy UE by separate SIB1 for RedCap or a separate field in legacy SIB1, etc. Offset values for s_id, t_id, and/or f_id may be configured respectively together with information on the initial BWP for the RedCap UE. Alternatively, combinations thereof may be configured in the form of a table. The corresponding offset values, for example, s_id_offset, t_id_offset, and/or f_id_offset may be used independently or in combination of two or more. Alternatively, the offset values may be used all together.

As an example of Proposal 1-3, an RA-RNTI may be calculated as in Equation 3.

$$\text{RA-RNTI}=1+(s\_id+s\_id\_offset) \bmod 14+14\times(t\_id+t\_id\_offset) \bmod 80+14\times 80\times(f\_id+f\_id\_offset) \bmod 8+14\times 80\times 8\times ul\_carrier\_id \quad \text{[Equation 3]}$$

According to Proposal 1-3, there may be no restrictions related to BWP configurations, and additional offset(s) may be simply introduced without changing the range of RA-RNTI allocation, and thus, the RedCap UE is capable of calculating a different RA-RNTI from than that of the legacy UE.

According to Proposals 1-1, 1-2 and 1-3, even if the RedCap UE transmits a PRACH preamble on the same RO as the legacy UE, the RA-RNTI for the RedCap UE may be calculated differently from the RA-RNTI for the legacy UE. Since the network knows each initial UL BWP, the network may calculate two RA-RNTIs for the preamble transmitted on the RO shared by the RedCap UE and the legacy UE. Accordingly, the network may transmit scheduling DCI suitable for the legacy UE and scheduling DCI suitable for the RedCap UE in consideration of a reduced BW, a relaxed processing time/capability, etc. by masking the DCI with different RA-RNTIs, respectively (see 1703 of FIG. 4(*a*)).

The RedCap UE may perform blind decoding of the DCI related to its RA-RNTI (see 1703 of FIG. 4(*a*)) and then transmit Msg3 based on scheduling different from the legacy UE (see 1705 of FIG. 4(*a*)).

Figures 10, 11:
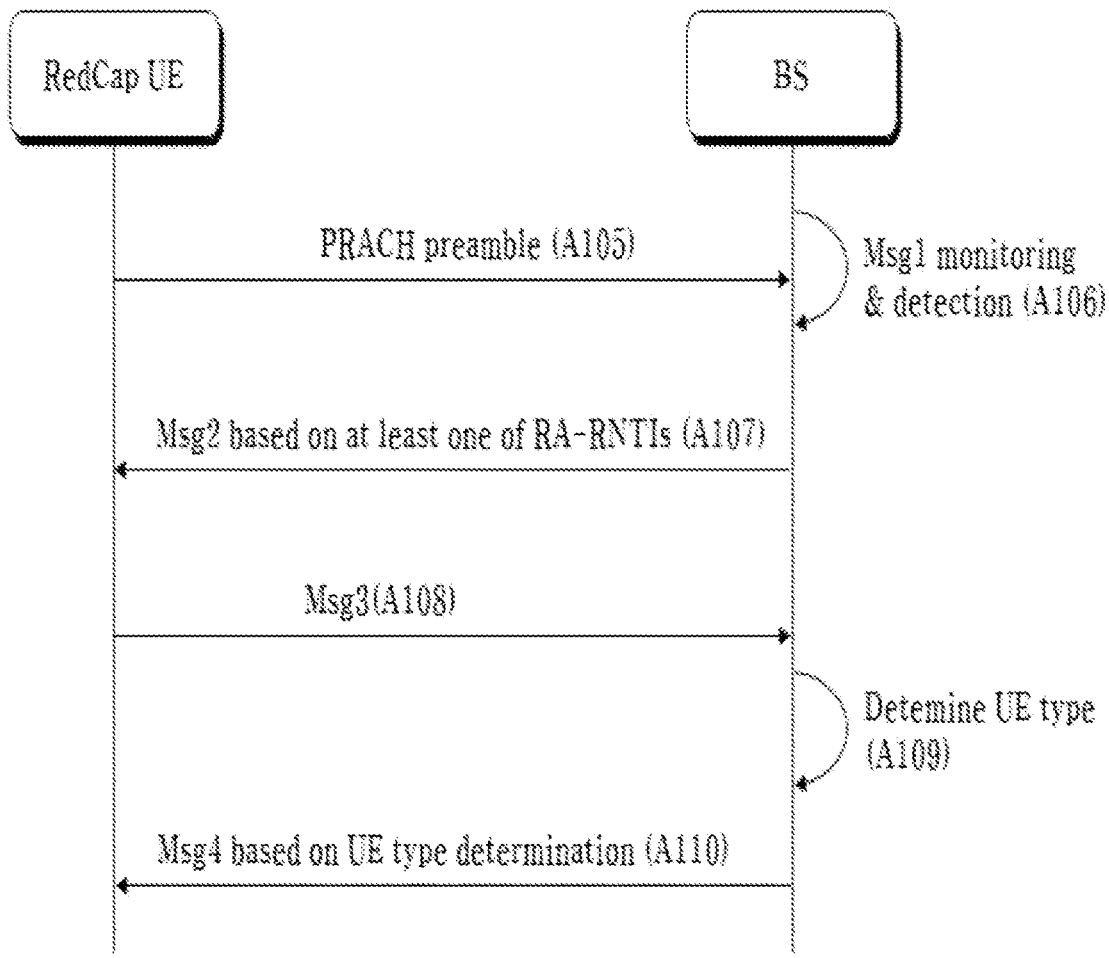
FIG. 10 illustrates a random access procedure according to an embodiment of the present disclosure.
FIG. 11 illustrates message 2 (Msg2) physical downlink control channel (PDCCH) cyclic redundancy check (CRC) scrambling according to an embodiment of the present disclosure.

FIG. 10 illustrates an exemplary RA procedure according to an embodiment of the present disclosure.

The example of FIG. 10 may be applied to an RA procedure between a BS and a UE in a 3GPP-based wireless communication system.

Referring to FIG. 10, the UE may transmit Msg1 including a PRACH preamble (A105).

The BS may detect Msg1 including the PRACH preamble by performing monitoring on RA resources (A106).

The BS may transmit Msg2 for an RAR based on Msg1 (A107). In the transmission of Msg2, the BS may determine a plurality of different RA-RNTIs, based on (a) that the BS support an RA procedure for the first type of UE (e.g., legacy NR UE) having a first maximum UE bandwidth as well as an RA procedure for the second type of UE (e.g., RedCap UE) having a second maximum UE bandwidth smaller than the first maximum UE bandwidth; (b) that Msg1 is detected on a PRACH resource shared between the first type of UE and the second type of UE; and (c) that at least one of PRACH preamble sequences for the first type of UE is reused for the second type of UE. The BS may transmit Msg2 based on at least one of the plurality of RA-RNTIs.

The plurality of RA-RNTIs may include a first type of RA-RNTI related to the first type of UE and a second type of RA-RNTI related to the second type of UE. The second type of RA-RNTI may be determined by applying an offset to the first type of RA-RNTI.

In the transmission of Msg2, the BS may transmit both Msg2 for the first type of UE and Msg2 for the second type of UE based on the plurality of RA-RNTIs.

The UE may monitor/detect Msg2 based on its RA-RNTI. The UE may be the second type of UE having the second maximum UE bandwidth smaller than the first maximum UE bandwidth supported by the first type of UE (e.g., legacy NR UE). In this case, even though the UE transmits Msg1 based on the same PRACH preamble sequence and the same PRACH resource as the PRACH preamble sequence and PRACH resource used by the first type of UE, the UE may detect Msg2 based on the second type of RA-RNTI that is different from the first type of RA-RNTI used by the first type of UE. The UE, for example, the second type of UE, may be a RedCap UE in a 3GPP-based wireless communication system. The RedCap UE may be an intelligent surveillance camera, a smart watch, or a smart meter.

The UE may transmit Msg3 (A108). The BS may receive Msg3 in response to Msg2. The BS may determine whether the UE that transmitted the PRACH preamble is the first type of UE or the second type of UE, based on which RA-RNTI among the plurality of RA-RNTIs Msg 3 is associated with.

The BS may determine the type of the corresponding UE based on Msg3 (A109).

The BS may transmit Msg4 based on the type of the corresponding UE (A110).

The BS may generate/transmit SIB1 based on the type of the corresponding UE. The BS may configure a BWP based on the type of the corresponding UE.

[Proposal 2] when RedCap UE Sharing at Least Parts of RA Configurations (e.g., RO, Preamble ID, and/or Search Space) with Legacy UE Transmits PRACH Preamble (Msg1), Network May Configure Msg3 Scheduling for RedCap UE Different from that of Legacy UE by Masking Additional Bits as Well as RA-RNTI to CRC of Msg2 Scheduling DCI.

The network may provide the UE with a configuration for transmitting Msg3 in Msg2. A 24-bit CRC may be attached to DCI of Msg2, and an RA-RNTI may be masked to the last 16 bits of the 24-bit CRC. This may be interpreted to mean that 00000000 is masked to the first 8 bits of the 24-bit CRC and the RA-RNTI is masked to the last 16 bits.

Referring to FIG. 11, as an example of Proposal 2, the network may identify the RedCap UE from the legacy UE by additionally masking a predefined $L_R$-bit string ($1<=L_R<=8$) rather than an all-zero sequence to the first 8 bits. That is, the network may mask the all-zero sequence to the first 8 bits of the 24-bit CRC for the legacy UE, and the network may mask a non-zero sequence to the first 8 bits of the 24-bit CRC for the RedCap UE. For each UE, an RA-RNTI may be masked to the last 16 bits.

For example, when a preamble is transmitted on an RO shared by the RedCap UE and the legacy UE, the network may additionally mask a 4-bit string of 1111 to the 5th, 6th, 7th, and 8th bits of the CRC of DCI, where the DCI includes DCI scheduling a PDSCH suitable for the legacy UE or DCI scheduling a PDSCH suitable for the RedCap UE (see 1703 of FIG. 4(*a*)). That is, for the DCI scheduling the PDSCH suitable for the legacy UE, it may be seen that a 4-bit string of 0000 is additionally masked to the 5th, 6th, 7th, and 8th bits of the CRC of the corresponding DCI. The RedCap UE may perform blind decoding of the DCI by attaching and masking 1111 to the first 4 bits of its RA-RNTI (see 1703 of FIG. 4(*a*)) and then transmit Msg3 based on the scheduling different from that of the legacy UE (see 1705 of FIG. 4(*a*)).

In the above example, the 4 bits and the corresponding bit mask sequence are merely for convenience of description, and the present disclosure is not limited thereto.

[Proposal 3] when RedCap UE is Scheduled to Transmit Msg3 Separately from Legacy UE, Relaxed Processing Time/Capability Different from that of Legacy UE May be Configured.

In an RA procedure before reporting the capability of the UE, a predetermined default value may be used. The RA UE processing times determined in the Rel-15 and Rel-16 system specifications are as follows.

$N_1$: Processing time for PDSCH processing capability 1 in consideration of additional DM-RS $N_2$: PUSCH processing time for PUSCH timing capability 1

$N_1$ and $N_2$ may be selected from the default table according to the numerology (i.e., SCS). The RedCap UE may not support the default processing times of the Rel-15 and 16 NR systems due to complexity reduction. Therefore, the network may perform scheduling for Msg3 transmission differently for the RedCap UE and the legacy UE in order to relax the processing times of the RedCap UE. For example, if the network detects a preamble on an RO shared by the legacy UE and the RedCap UE, the network may schedule Msg3 transmission resources for the RedCap UE and expect the reception of Msg3 from the RedCap UE at a time later than the expected reception time of the Rel-15 and 16 NR systems.

The timings determined by $N_1$ and $N_2$ during initial access are as follows (where $N_{T,1}$ and $N_{T,2}$ are values obtained by converting the symbol level of $N_1$ and $N_2$ into time units for each numerology).

Maximum gap for Msg1 retransmission after RAR window or last symbol of PDSCH: $N_{T,1}$+0.75 ms Minimum gap between last symbol of PDCCH order and first symbol of Msg1 when RACH starts by PDCCH: $N_{T,2}+\Delta_{BWPSwitching}+\Delta_{Delay}$ Minimum gap between last symbol of Msg2 PDSCH and first symbol of Msg3 PUSCH: $N_{T,1}+N_{T,2}$+0.5 ms HARQ-ACK transmission after Msg4 reception: $N_{T,1}$+0.5 ms

[Proposal 3-1] New Default Table for UE Processing Times: $N_1$ and $N_2$ May be Introduced in Consideration of Capability of RedCap UE.

A processing time table that is more relaxed than the processing time table of the current NR system may be defined for the RedCap UE in consideration of a clock speed supported by the RedCap UE. Tables 6 and 7 below show the default tables of the Rel-15 and Rel-16 NR systems. Specifically, Table 6 shows the PDSCH processing time for PDSCH processing capability 1, and Table 7 shows the PUSCH preparation time for PUSCH timing capability 1.

TABLE 6

| | PDSCH decoding time $N_1$ [symbols] | |
|---|---|---|
| μ | dmrs-AdditionalPosition = pos0 in DMRS-DownlinkConfig in both of dmrs-DownlinkForPDSCH-Mapping TypeA, dmrs-DownlinkForPDSCH-Mapping TypeB | dmrs-AdditionalPosition ≠ pos0 in DMRS-DownlinkConfig in either of dmrs-DownlinkForPDSCH-MappingTypeA, dmrs-DownlinkForPDSCH-Mapping TypeB or if the higher layer parameter is not configured |
| 0 | 8 | $N_{1,0}$ = 14 |
| 1 | 10 | 13 |
| 2 | 17 | 20 |
| 3 | 20 | 24 |

TABLE 7

| μ | PUSCH preparation time $N_2$ [symbols] |
|---|---|
| 0 | 10 |
| 1 | 12 |
| 2 | 23 |
| 3 | 36 |

[Proposal 3-2] Processing Time Factors Multiplied by UE Processing Times $N_1$ and $N_2$ May be Defined in Consideration of Capability of RedCap UE.

Since the RedCap UE may not satisfy the processing times of the legacy NR system, the network may calculate minimum gaps by newly defining/configuring alpha1 and alpha2 that are multiplied by $N_{T,1}$ and $N_{T,2}$, respectively, where each of alpha1 and alpha2 is a real number greater than or equal to 1.

For example, the relaxed initial access message transmission timing of the RedCap UE may be calculated as follows.

Maximum gap for Msg1 retransmission after RAR window or last symbol of PDSCH: alpha1×$N_{T,1}$+0.75 ms Minimum gap between last symbol of PDCCH order and first symbol of Msg1 when RACH starts by PDCCH: alpha2×$N_{T,2}+\Delta_{BWPSwitching}+\Delta_{Delay}$ Minimum gap between last symbol of Msg2 PDSCH and first symbol of Msg3 PUSCH: alpha1×$N_{T,1}$+alpha2×$N_{T,2}$+0.5 ms HARQ-ACK transmission after Msg4 reception: alpha1×$N_{T,1}$+0.5 ms For example, for Msg3 transmission with an SCS of 15 kHz where the position of an additional PDSCH DM-RS is pos0, the minimum gap of the Rel-15 and 16 NR systems is given as 0.06667×8+0.06667×10+0.5=1.7 ms (where 0.06667 is the symbol period of 15 kHz). Assuming that the RedCap UE processing time factors are 2 and 2.5, respectively, a minimum gap of 2×0.06667×8+2.5×0.06667×10+0.5=3.2 ms may be given to the RedCap UE, which is relaxed by 1.5 ms compared to the legacy NR system.

[Proposal 3-3] Processing Time Offsets Added to UE Processing Times $N_1$ and $N_2$ May be Defined in Consideration of Capability of RedCap UE.

Minimum gaps may be calculated based on beta1 and beta2 that are added to the two processing time values $N_{T,1}$ and $N_{T,2}$, respectively, where each of beta1 and beta2 is a real number greater than or equal to 1. The relaxed initial access message transmission timing of the RedCap UE may be calculated as follows.

Maximum gap for Msg1 retransmission after RAR window or last symbol of PDSCH:
($N_{T,1}$+beta1)+0.75 ms Minimum gap between last symbol of PDCCH order and first symbol of Msg1 when RACH starts by PDCCH:
($N_{T,2}$+beta2)+$\Delta_{BWPSwitching}$+$\Delta_{Delay}$ Minimum gap between last symbol of Msg2 PDSCH and first symbol of Msg3 PUSCH:
($N_{T,1}$+beta1)+($N_{T,2}$+beta2)+0.5 ms HARQ-ACK transmission after Msg4 reception: ($N_{T,1}$+beta1)+0.5 ms For example, for Msg3 transmission with an SCS of 15 kHz where the position of an additional PDSCH DM-RS is pos0, the minimum gap of the Rel-15 and 16 NR systems is given as 0.06667×8+0.06667×10+0.5=1.7 ms. Assuming that the RedCap UE processing time offsets are 4 and 5, respectively, a minimum gap of 0.06667×(8+4)+0.06667×(10+5)+0.5=2.3 ms may be given to the RedCap UE, which is relaxed by 0.6 ms compared to the legacy NR system.

[Proposal 4] when Processing Time of RedCap UE is Relaxed, Different Slot-Level Timing for Msg3 Transmission from that of Legacy UE May be Configured.

The RedCap UE may not support a slot-level timing for Msg3 transmission configured as default when the processing time is relaxed. In the Rel-15 and Rel-16 NR systems, the UE may be configured to receive Msg2 in slot n and transmit Msg3 in slot (n+$K_2$+Δ) that satisfies the minimum gap between the last symbol of Msg2 PDSCH and the first symbol of Msg3 PUSCH, where $K_2$ is 4 bits of time domain resource allocation (TDRA) in a Msg2 UL grant, which is given by the table tougher with the starting point S and length L of a PDSCH. $K_2$ may be set to {j, . . . , j+3} (where j is a value determined according to the numerology). Due to relaxation of $N_1$ and $N_2$, $K_2$ in the default table may not support the minimum gap.

[Proposal 4-1] New TDRA of $K_2$ May be Introduced in Consideration of Relaxed Processing Times $N_1$ and $N_2$ of RedCap UE.

Depending on the degree of relaxation of the processing times of the RedCap UE, a TDRA table having defined therein default values of $K_2$ capable of supporting the minimum gap for all values may be introduced.

[Proposal 4-2] TDRA Offset for $K_2$ May be Introduced in Consideration of Relaxed Processing Times $N_1$ and $N_2$ of RedCap UE.

Since a TDRA offset $K_{2,offset}$ may be introduced due to relaxation of the processing times of the RedCap UE, the TDRA offset may be expressed by an equation of $N_1$ and $N_2$. For example, when Proposal 3-3 is applied, $K_2$ may be defined as follows: $K_2$=ceil ((beta1+beta2)/14), where ceil ( ) denotes a ceiling function.

Figure 12:
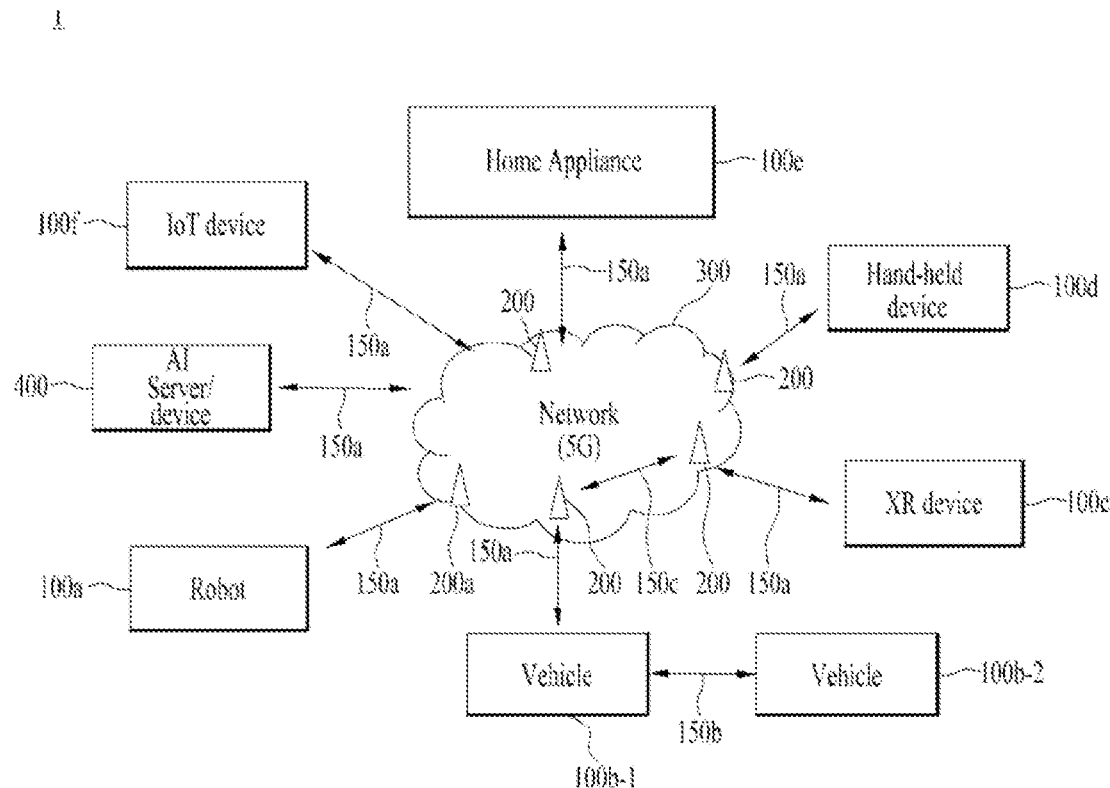
FIGS. 12 and 13 illustrate a communication system 1 and wireless devices applied to the present disclosure.

FIG. 12 illustrates a communication system 1 applied to the present disclosure.

Referring to FIG. 12, a communication system 1 includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
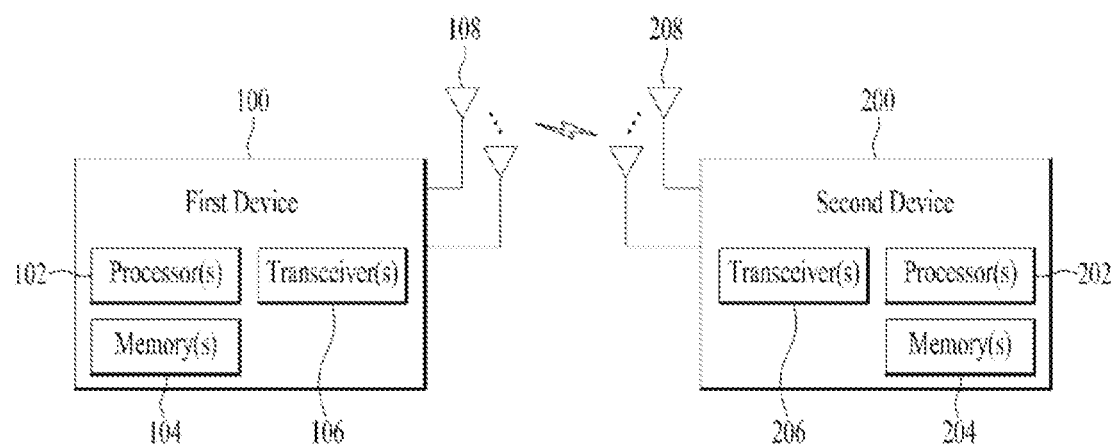

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
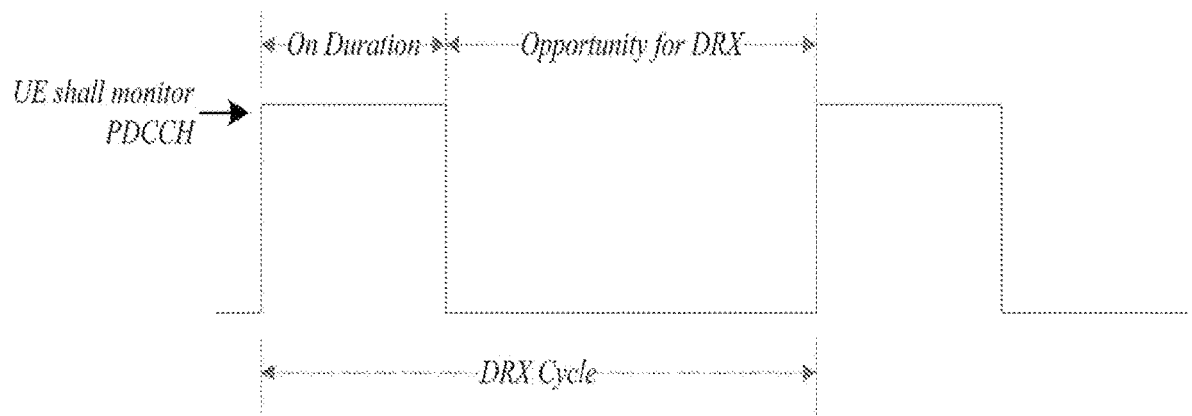
FIG. 14 illustrates a discontinuous reception (DRX) operation applicable to the present disclosure.

FIG. 14 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

A DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

What is claimed is:
1. A method performed by a user equipment (UE), the method comprising:
   transmitting, through a physical random access channel (PRACH), a random access preamble;
   receiving, through a physical downlink shared channel (PDSCH), a random access response (RAR) including an RAR uplink grant; and
   transmitting a physical uplink shared channel (PUSCH) based on the RAR uplink grant, wherein the PUSCH transmission is performed based on that a first time between a last symbol of the PDSCH and an initial symbol of the PUSCH is not smaller than a second time, wherein the second time is determined based on a sum of (i) a time duration related to a PDSCH processing time, (ii) a time duration related to a PUSCH preparation time, and (iii) a first time offset, and wherein, based on that the UE is a second type UE having a reduced capability than a first type UE, the first time offset is determined to be equal to or longer than 1 milli-second (msec).

2. The method of claim 1, wherein, for the first type UE, the second time is determined as a sum of the time duration related to the PDSCH processing time, the time duration related to the PUSCH preparation time, and 0.5 msec.

3. The method of claim 1, further comprising:

detecting, from a higher layer of the UE, a request for a second PRACH transmission wherein the second PRACH transmission is prepared no later than a third time, wherein the third time is determined based on a sum of the time duration related to the PDSCH processing time, and a second time offset, and wherein, based on that the UE is the second type UE, the second time offset is determined to be equal to or longer than 1 msec.

4. The method of claim 1, wherein the UE is a reduced capability user equipment (RedCap UE).

5. The method of claim 4, wherein the RedCap UE is an intelligent surveillance camera, a smart watch, or a smart meter.

6. A non-transitory processor-readable medium storing instructions for performing the method of claim 1.

7. A device comprising:

a memory configured to store instructions; and a processor configured to perform operations by executing the instructions stored in the memory, wherein the operations comprise:

transmitting, through a physical random access channel (PRACH), a random access preamble;

receiving, through a physical downlink shared channel (PDSCH) a random access response (RAR) including an RAR uplink grant; and transmitting a physical uplink shared channel (PUSCH) based on the RAR uplink grant, wherein the PUSCH transmission is performed based on that a first time between a last symbol of the PDSCH and an initial symbol of the PUSCH is not smaller than a second time, wherein the second time is determined based on a sum of (i) a time duration related to a PDSCH processing time, (ii) a time duration related to a PUSCH preparation time, and (iii) a first time offset, and wherein, based on that the device is a second type device having a reduced capability than a first type device, the first time offset is determined to be equal to or longer than 1 milli-second (msec).

8. The device of claim 7, further comprising:

a transceiver, wherein the device is a reduced capability user equipment (RedCap UE).

9. A method performed by a base station (BS), the method comprising:

receiving, from a user equipment (UE) through a physical random access channel (PRACH), a random access preamble;

transmitting, to the UE through a physical downlink shared channel (PDSCH), a random access response (RAR) including an RAR uplink grant; and receiving, from the UE, a physical uplink shared channel (PUSCH) based on the RAR uplink grant, wherein the PUSCH reception is performed based on that a first time between a last symbol of the PDSCH and an initial symbol of the PUSCH is not smaller than a second time, wherein the second time is determined based on a sum of (i) a time duration related to a PDSCH processing time of the UE, (ii) a time duration related to a PUSCH preparation time of the UE, and (iii) a first time offset, and wherein, based on that the UE is a second type UE having a reduced capability than a first type UE, the first time offset is determined to be equal to or longer than 1 milli-second (msec).

10. The method of claim 9, wherein, based on that the UE is the first type UE, the second time is determined as a sum of the time duration related to the PDSCH processing time, the time duration related to the PUSCH preparation time, and 0.5 msec.

11. The method of claim 9, further comprising:

receiving a second PRACH transmission from the UE, wherein the second PRACH transmission is prepared at the UE no later than a third time, wherein the third time is determined based on a sum of the time duration related to the PDSCH processing time, and a second time offset, and wherein, based on that the UE is the second type UE, the second time offset is determined to be equal to or longer than 1 msec.

12. The method of claim 9, wherein the second type UE is a reduced capability user equipment (RedCap UE).

13. A non-transitory processor-readable medium storing instructions for performing the method of claim 9.

14. A device comprising:

a memory configured to store instructions; and a processor configured to perform operations by executing the instructions stored in the memory, wherein the operations comprise:

receiving, from a user equipment (UE) through a physical random access channel (PRACH), a random access preamble;

transmitting, to the UE through a physical downlink shared channel (PDSCH), a random access response (RAR) including an RAR uplink grant; and receiving, from the UE, a physical uplink shared channel (PUSCH) based on the RAR uplink grant, wherein the PUSCH reception is performed based on that a first time between a last symbol of the PDSCH and an initial symbol of the PUSCH is not smaller than a second time, wherein the second time is determined based on a sum of (i) a time duration related to a PDSCH processing time of the UE, (ii) a time duration related to a PUSCH preparation time of the UE, and (iii) a first time offset, and wherein, based on that the UE is a second type UE having a reduced capability than a first type UE, the first time offset is determined to be equal to or longer than 1 milli-second (msec).

15. The device of claim 14, further comprising:
a transceiver,
wherein the device is a base station.

\* \* \* \* \*